United States Patent
Sircar et al.

(10) Patent No.: US 10,257,131 B2
(45) Date of Patent: Apr. 9, 2019

(54) PRIVATE TEXT CHATTING SESSIONS

(71) Applicant: BlackBerry Limited, Waterloo (CA)

(72) Inventors: Shiladitya Sircar, Ottawa (CA); Sean Hungerford, Kitchener (CA); Bradford Lawrence Spencer, Hammonds Plains (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/828,521

(22) Filed: Dec. 1, 2017

(65) Prior Publication Data

US 2018/0102991 A1 Apr. 12, 2018

Related U.S. Application Data

(63) Continuation of application No. 14/751,538, filed on Jun. 26, 2015, now Pat. No. 9,942,180.

(51) Int. Cl.
*H04L 12/58* (2006.01)
*H04L 12/18* (2006.01)

(52) U.S. Cl.
CPC ........ *H04L 51/043* (2013.01); *H04L 12/1822* (2013.01)

(58) Field of Classification Search
CPC .......................... H04L 51/043; H04L 12/1822
See application file for complete search history.

(56) References Cited

U.S. PATENT DOCUMENTS

| | | | | | |
|---|---|---|---|---|---|
| 6,879,994 | B1 * | 4/2005 | Matsliach | ........... | G06F 11/3495 709/204 |
| 7,734,692 | B1 * | 6/2010 | Kaplan | ............... | H04L 12/1822 709/204 |
| 8,180,369 | B1 * | 5/2012 | Sheikh | ............... | G06Q 30/0205 340/8.1 |
| 8,739,267 | B2 * | 5/2014 | Le Rouzic | ............. | G06Q 20/02 380/255 |

(Continued)

FOREIGN PATENT DOCUMENTS

| EP | 0788269 A2 * | 8/1997 | ........ H03M 3/42008 |
|---|---|---|---|
| EP | 2930882 | 10/2015 | |

(Continued)

OTHER PUBLICATIONS

European Examination Report dated Jul. 19, 2017, received for European Application No. 16165585.7.

(Continued)

*Primary Examiner* — Kostas J Katsikis
(74) *Attorney, Agent, or Firm* — Jeffrey N. Giunta; Fleit Gibbons Gutman Bongini & Bianco P.L.

(57) ABSTRACT

A system and method for private text chatting. A request is sent to a remote device to establish a private text chat session. Prior to receiving an acceptance of the private chat session request from the remote device, at least one text chat message is received from the remote device and stored. The acceptance of the private chat session request is received from the remote device. Subsequent to receiving the acceptance of the private chat session request, a private text chat session interface is displayed to conduct the private text chat session. The received at least one text chat message is displayed in the private text chat session interface.

20 Claims, 10 Drawing Sheets

(56) References Cited

U.S. PATENT DOCUMENTS

| | | | | |
|---|---|---|---|---|
| 8,914,039 | B1* | 12/2014 | Sheikh | H04W 4/21 455/456.1 |
| 9,119,166 | B1* | 8/2015 | Sheikh | H04W 4/21 |
| 9,226,147 | B2* | 12/2015 | Brander | H04L 51/04 |
| 9,332,043 | B1* | 5/2016 | Caldarone | H04L 65/403 |
| 9,544,257 | B2* | 1/2017 | Ogundokun | H04L 51/12 |
| 9,699,600 | B1* | 7/2017 | Sheikh | H04W 4/02 |
| 9,720,578 | B1* | 8/2017 | Caldarone | G06F 3/0484 |
| 9,900,271 | B2* | 2/2018 | Griffin | H04L 12/1827 |
| 2003/0007464 | A1* | 1/2003 | Balani | G06Q 30/0601 370/310 |
| 2004/0260781 | A1* | 12/2004 | Shostack | G06Q 30/02 709/207 |
| 2005/0060368 | A1* | 3/2005 | Wang | H04L 12/185 709/204 |
| 2005/0128997 | A1* | 6/2005 | Zhao | H04L 29/12122 370/349 |
| 2005/0177614 | A1 | 8/2005 | Bourne | |
| 2007/0288560 | A1 | 2/2007 | Bou-Ghannam et al. | |
| 2007/0130258 | A1* | 6/2007 | Almberg | G06Q 10/107 709/204 |
| 2007/0150723 | A1* | 6/2007 | Estable | H04L 63/0823 713/155 |
| 2008/0235336 | A1* | 9/2008 | Stern | G06Q 10/107 709/206 |
| 2008/0301242 | A1* | 12/2008 | Akella | G06Q 10/107 709/206 |
| 2008/0316357 | A1* | 12/2008 | Achari | G06F 21/84 348/564 |
| 2009/0063991 | A1* | 3/2009 | Baron | G06Q 10/10 715/751 |
| 2010/0228964 | A1* | 9/2010 | Booth | H04L 63/16 713/151 |
| 2012/0077536 | A1* | 3/2012 | Goel | H04L 65/4061 455/518 |
| 2013/0110946 | A1* | 5/2013 | Bradshaw | H04L 12/6418 709/206 |
| 2013/0151622 | A1* | 6/2013 | Goel | H04L 12/1822 709/205 |
| 2013/0198657 | A1* | 8/2013 | Jones | H04L 67/36 715/758 |
| 2014/0050307 | A1* | 2/2014 | Yuzefovich | H04M 15/41 379/68 |
| 2014/0164530 | A1* | 6/2014 | Stoertenbecker | H04L 51/32 709/206 |
| 2014/0298210 | A1* | 10/2014 | Park | G06F 3/0486 715/758 |
| 2014/0331150 | A1* | 11/2014 | Griffin | H04L 12/1827 715/758 |
| 2015/0180808 | A1 | 6/2015 | Moisa | |
| 2015/0288633 | A1* | 10/2015 | Ogundokun | H04L 51/12 709/206 |
| 2015/0350895 | A1* | 12/2015 | Brander | H04L 51/04 455/411 |
| 2016/0018895 | A1* | 1/2016 | Sidi | G06F 3/017 715/752 |

FOREIGN PATENT DOCUMENTS

| | | | | |
|---|---|---|---|---|
| WO | WO-2006048515 A1 * | 5/2006 | | G06Q 20/02 |
| WO | WO 2010148699 A1 * | 12/2010 | | H04L 12/1818 |
| WO | WO-2012052818 A1 * | 4/2012 | | H04L 9/085 |

OTHER PUBLICATIONS

European Examination Report dated Oct. 27, 2010 received for European Application No. 16165585.7.
Extended European Search Report dated Jul. 14, 2016, received for European Application Nmber 16165585.7.

* cited by examiner

PRIVATE TEXT CHATTING SESSIONS

FIELD OF THE DISCLOSURE

The present disclosure generally relates to data communications, and more particularly to communications via text chatting sessions.

BACKGROUND

Many forms of electronic communications have developed. Telephone voice calls, for example, allow one person to place a call and, if the called person answers, the two people can engage in an interactive voice conversation. Various forms of text communications over electronic means have also developed. One example is text communications using Short Messaging Service (SMS) or similar techniques. Electronic text communications allow a person to simply create and send a text message to another person. That message is delivered to an account or device associated with the receiving party, and the receiving party is able to see that message whenever the person accesses that account or uses that device.

Electronic text communications differ from voice telephone calls in several respects. For example, when someone sends a text message to a receiving party, there is no way to know when the receiving party will actually see and read the message. The receiving party may not see and read that text message for some time, thus delaying the interaction between the sending and receiving party. This is different from voice telephone calls, where the caller reaches the called person to establish the voice call and both persons, the caller and called person, are actively engaged in an interactive voice exchange and the exchange of information is immediate.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
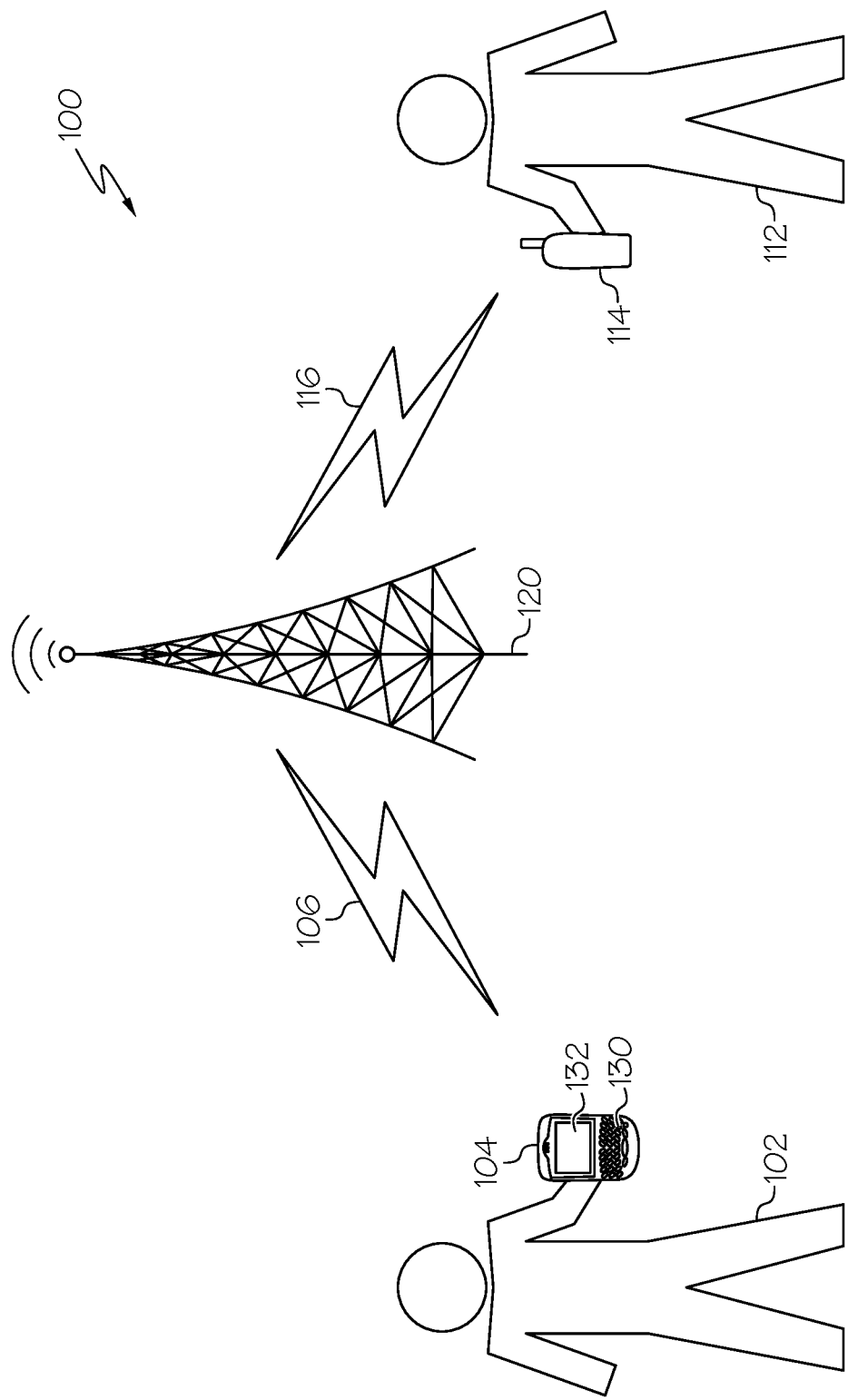
FIG. 1 illustrates a two person private text chat session scenario according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, designed and otherwise configured to be carried and operated while being held in a human hand or hands.

The below described systems and methods provide a private text chatting capability that allows a private text chat session to be established between participants. In an example, a private text chat session is a session where two or more participants exchange private text chat messages where the participants are physically present during the private text chat session and are able to actively engage in the text conversation to allow immediate interactions. Device operating characteristics encourage each participating party be actively using the device when receiving private text chat messages so that responses to each received private text message are able to be provided as the text conversation progresses in a manner similar to voice conversations. In some examples, a private text chat session is able to allow a user of a device to have an active private chat session with only one other active participant at a given time, while other examples allow private chat text sessions to include more than two participants. During private text chat sessions, in some examples, users are provided with notifications of other events occurring on the device, such as newly received messages or content, that are, for example, modified to be one or more of less intrusive, reduced, not provided at all, or combinations of these.

The private text chat session in some examples are initiated with user interface elements that allow a caller to send a request to a called party, and the called party is presented with a user interface element through which the called party accepts the request in order to create the private text chat session. This interaction of user interface elements on the caller's device and the device of the called party causes both parties to mutually agree to create the private text chat session and to be present at their respective devices at the start of the private text chat session. After the parties agree to start the private text chat session, a new private chat conversation screen is presented to the user of each device.

Once the screen used to conduct the private text chat session is presented to the user, users are able to enter private text chat messages that are sent to other participants. In addition to exchanging private text chat messages in a manner similar to SMS communications, the participants are able to exchange data files such as image data files, video data files, work processing or spreadsheet data files, or any other type of data file, during the private text chat session. In some examples, such data files are encrypted and stored as part of the private text chat session. These data files are able to be automatically deleted upon termination of the private text chat session, able to be stored for use after termination of the private text chat session, otherwise handled by the user's device, or combinations of these. In some examples, the types of data files exchanged during a private text chat communication session are limited to file types that can be processed by certain applications, such as applications able to be sufficiently controlled by the private text communications processing to ensure that the data will be deleted at the end of the session and that no data in those applications is able to be saved or shared in any way outside of the controls provided by the private text communications processing.

In some examples, indicia, such as data indicating the source of the text data or other received data, is not included on the display. For example, each party's avatar, display name, and other status messages are not included in the display of messages and data presented in a private text chat session. Not providing such indicia enhances the privacy and security of the exchange, particularly to nearby persons who may see the display screen. In some example, only some of the private text chat messages are displayed without such indicia. For example, private text chat messages received from other devices may be displayed without indicia of the source of those private chat text messages, while locally entered messages may have indicia indicating the source of those messages. In some examples, restrictions on a user's ability to copy data exchanged in the private text chat session is restricted. For example, a user may be prohibited from copying the text exchanged in the private text chat session. In some examples, if another participant captures a screen shot, the other party(s) are notified that the screen shot has been captured.

In some examples, when the private text chat session is closed by the user, the private text chat session is terminated. The text and data exchanged in some private text chat sessions is ephemeral. In some examples, all text and other data sent or received, as well as any metadata, are ephemeral in a private chat such that no record exists on either the initiator or recipients devices after the private text chat session terminates.

FIG. 1 illustrates a two person private text chat session scenario 100 according to an example. The two person private text chat session scenario 100 illustrates one example of a scenario of using a private text chat session to allow two persons to more effectively communicate in an interactive and private text chat session. The two person private text chat session scenario 100 depicts communications between two users of mobile electronic devices. A first user 102 uses a first electronic device 104 to perform various communications function, such as text communications. A second user 112 similarly uses a second electronic device 114 to perform similar communications.

The illustrated first electronic communications device 104 is in wireless communications with a base station 120 via a first wireless link 106. The illustrated second electronic communications device 114 is similarly in wireless communications with a base station 120 via a second wireless link 116. The illustrated wireless links are able to be any suitable wireless link for data communications, such as cellular data, SMS communications links, shorter range wireless links such as Wi-Fi®, Bluetooth®, or any other suitable data communications link. In an example, the first electronic device 104 and the second electronic device 114 operate to implement a private text chat session as is described below.

The two person private text chat session scenario 100 depicts some of the user interface components of the first electronic communications device 104. The first electronic communications device 104 is one example of a communications device that is able to participate in a private text chat session and includes a keyboard 130 and a display screen 132. As is understood by practitioners of ordinary skill in the relevant arts, the keyboard 130 is able to be a physical keyboard or an on-screen keyboard which is presented on part of a display screen, which might be a larger version of the illustrated display screen 132. In further examples, electronic communications devices are able to include other user interface facilities such as dedicated or programmable buttons, trackballs, trackpads, thumb wheels, lights, audio generation devices, other devices, or combinations of these. The second electronic communication device 114 is able to be similar to the illustrated first electronic communications device 104, or have other user interface facilities and features.

In an example, private text chat sessions are performed with peer-to-peer data communications of the private text chat messages and any data between the first electronic communications device 104 and the second electronic communications device 114. In such peer-to-peer data communications, data is sent from one device to the other device through a communications infrastructure but without being stored in any device within that communications infrastructure. For example, there is no "cloud" server receiving and storing private text, any data such as shared files, or combinations of these that are exchanged as part of the private text chat session. Such a peer-to-peer architecture enhances the security of communicating via private text chat sessions relative to other text chatting options available to a user.

Although the two person private text chat session scenario 100 illustrates a scenario implementing a private text chat session via handheld electronic devices, in further examples any suitable electronic communications device is able to be used to allow two users to implement a private text chat session. For example, one or both users are able to use desktop computers, vehicle mounted communications devices, any other suitable electronic device, or combinations of these. Additionally, although the examples describing private text chat sessions described communications between two users, the example of communications between two users is used to simplify the description of relevant aspects of the described examples. It is clear that the features described for communications between two users or electronic devices can be easily expanded to support private text chat sessions among more than two devices and users so as to implement a private text communications "conference call."

Figure 2:
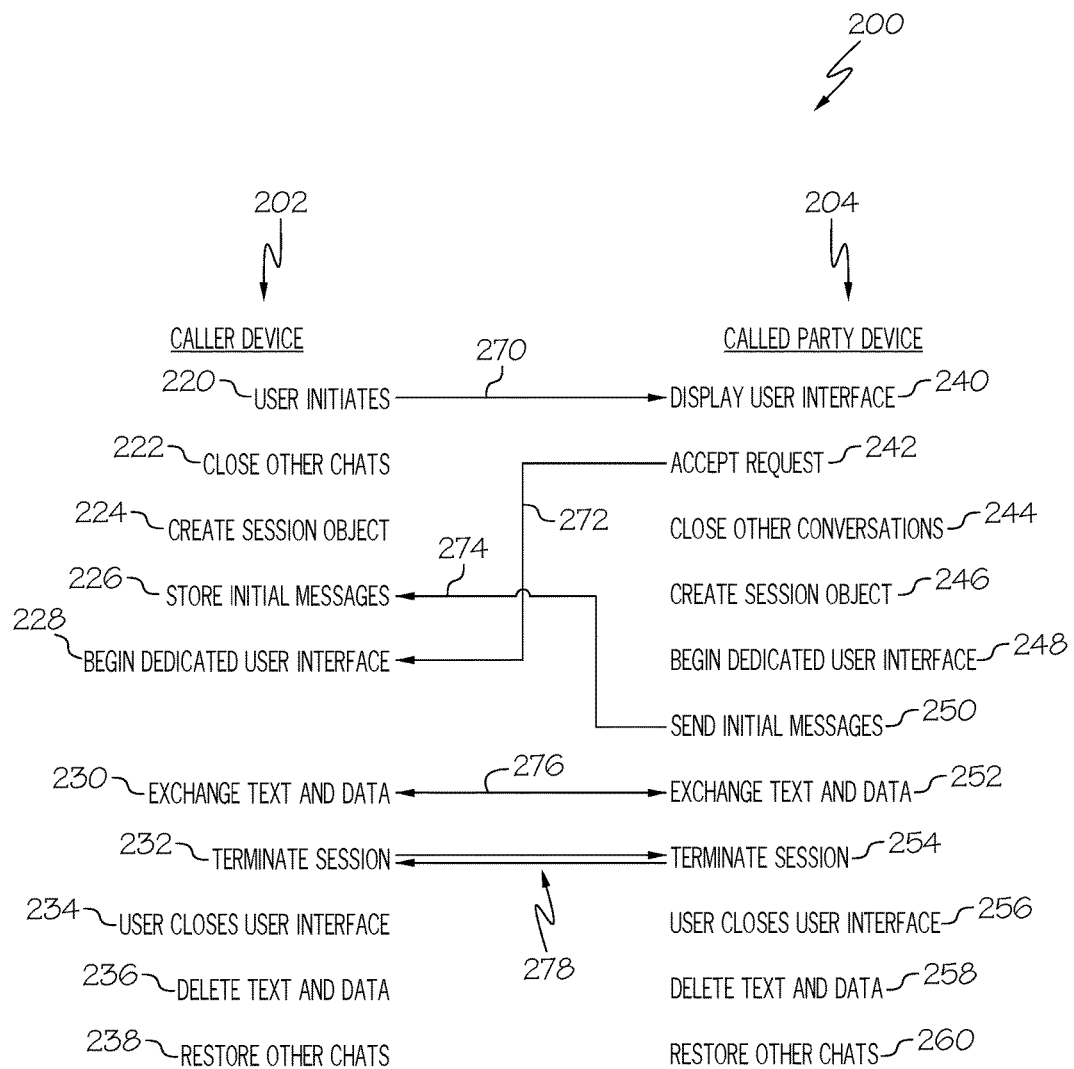
FIG. 2 illustrates a sequence diagram for a private text chat session, according to an example.

FIG. 2 illustrates a sequence diagram for a private text chat session 200, according to an example. The sequence diagram for a private text chat session 200 depicts an example of some of the steps performed by, and data communications between, two electronic devices when creating, maintaining, and terminating a private text chat session. In is clear that the illustrated sequence diagram is merely an example of a process to create, maintain, and terminate a private text chat session and alternative processes are able to achieve similar results.

The sequence diagram for a private text chat session 200 illustrates actions performed at both an electronic device associated with a caller, a "caller device 202," and another electronic device associated with a called party, a "called party device 204." In the interests of brevity, this description uses the term "caller device" to refer to the electronic device providing communications services to a user who is initiating the private text chat session, and the term "called party device" refers to the electronic device providing communications services to a user to whom the "caller" is sending a request to initiate the "private text chat session." Although references to these devices include descriptions of the users to whom they are respectively providing communications services it is clear that such devices are not required to be owned by, in the possession of, directly controlled by, or otherwise tied to these respective parties. It is further noted that in general, a particular electronic device is able to perform the functions of either the caller device 202 or the called party device 204 based upon which device is used to initiate private text chat session.

The sequence diagram for a private text chat session 200 begins at the caller device 202 when a user initiates a private text chat session 220. The user is able to initiate this session by any suitable technique. For example, a user interface is able to be provided by an electronic device operated by the user that allows the user to select a contact from a contact list, and an option for that contact would be to "initiate a private text chat session." Other techniques for initiating a private text chat session are also able to be used by the caller device.

When a user of the caller device 202 initiates a private text chat session, a private text chat session request 270 is sent from the caller device 202 to the called party device. In addition to sending the private text chat session request 270, the caller device 202 in one example closes other text chat sessions on the device 222 once a user selects to initiate a private text chat session. In an example, other text chat sessions include SMS text messing displays presented on the caller device and does not provide any display or notification of any received SMS text chat messages received after the other text chat session are closed until the private text chat session is terminated. Closing the other text chat sessions, such as SMS sessions or other text chat applications, on the caller device 202 allows a dedicated user interface to be presented and removes distractions of other text conversations from the user. In some examples, the caller device 202 will still operate to receive all data, including other text chat messages sent to the caller device 202, and that data will be stored for display to the user after the private text chat session is terminated. In further examples, user interfaces used to initiate the private text chat session exist along with other user interfaces and allow other applications, text chat sessions, the like, or combinations of these to exist until the private text chat session is established and the users are exchanging private test messages.

The caller device 202 in one example also creates a private text chat session programming object 224 based on the user initiating the private text chat session. In an example, a private text chat session programming object is a data structure that is used to associate all data and activities that are a part of the private text chat session. Creating the private text chat session object based on the user initiating the private text chat session allows data from the called party device to be received and properly maintained prior to receiving an acceptance from the called device 204 of the private text chat session request 270, as is described in more detail below.

The called party device 204 receives the private text chat session request 270 and displays a user interface 240 to notify the user of the called party device of the receipt of a request to create a the private text chat session. An example of such a user interface is described in more detail below. In various examples, different user interfaces are able to be used to notify the user of a received private text chat session request. In some examples, a full screen display such as is described below is used. In other examples, user interfaces such as smaller pop-up displays known as "toast" notifications, that allow other information to be displayed along with the notification of the received private text chat session request are able to be used. In some examples, notification of a receipt of a private text chat session request is able to use visual, audio, other notifications, and combinations of these that are similar or identical to those aspects of notifications used to indicate receipt of text chat messages in other applications, indicate other events on the device, or combinations of these.

In an example, the called party device receives an input from a user indicating that the user accepts the request 242 and based on that input sends a private text chat session acceptance message 272 to the caller device 202. The called party device 204 also closes other text chats 244 and creates a private text chat session programming object 246 in a manner similar to that described above for the caller device 202. The called party device 204 in one example then begins displaying a dedicated user interface 248 for conducting the private text chat session. The use of a dedicated user interface in some examples allows the user to focus on the private text chat session without distractions from other applications or functions of the electronic device being used to conduct the private text chat session. Other types of user interfaces are also able to be used to support a user's participating in a private text chat session.

In the example illustrated in the sequence diagram for a private text chat session 200, the private text chat session acceptance message 272 is delayed in transmission and arrives at the caller device 202 after a noticeable delay. Such delays are able to be caused in a wireless communications system due to a number of factors understood by practitioners of ordinary skill in the relevant arts. After creating the private text chat session programming object 246, the user of the called party device 204 enters and sends private text chat messages to the caller device in association with the created private text chat session. In this example, these initial text chat messages 274 are not delayed in transmission and arrive at the caller device 202 before the private text chat session acceptance message 272. These initial text chat messages 274 are referred to as initial text chat messages because they are received by the caller device 202 before the private text chat session acceptance message 272. In one example, the caller device 202 receives these initial text chat messages 274, which are identified as being associated with the private text chat session, and stores these initial text chat messages 226. In an example, these initial text chat messages 274 are stored without displaying them until the private text chat session acceptance message 272 is received.

As depicted in the sequence diagram for a private text chat session 200, the caller device 202 receives the private text chat session acceptance message 272 and beings display of a dedicated user interface 228. The dedicated user interface of the caller device 202 and the called party device 204 in one example are similar. These dedicated user interfaces in some examples support and encourage focusing a user's attention on the private text chat session without distractions. This encourages a more focused, interactive, and therefore potentially more productive interaction and exchange between users of these two devices. These dedicated user interfaces in some examples provide functions tailored to the private text chat session such as preventing or inhibiting a user from copying or otherwise capturing the text exchanged in the private text chat session. In some examples, a user may copy some or all of this information, but the other participant(s) of the private text chat session is notified of such copying.

The caller device 202 and the called party devices 204 exchange text and data 276. In some examples, the caller device 202 exchanges text and data 230 in a manner similar to the way in which the called party device 204 exchanges text and data 252. In other examples, the two devices may have different capabilities enabled for sending text and data with the other device. In various examples, the text and data 276 is able to include private text chat messages entered by a user into a dedicated user interface as well as other data present on or available to the respective device. For example, image files, video files, application program data such as word processing files, spreadsheet files, other types of data files, any other type of data whether organized in a file or otherwise, or combinations of these are able to be exchanged between the caller device 202 and the called party device 204 in association with the created private text chat session. In various examples, these data, such as data files of various types, are also protected in manner similar to that of the private text chat messages exchanged during the private text chat session. In some examples, the data exchanged is not available outside of the private text chat session and are deleted upon termination of the session. The data files or other data may also be protected from being accessed by other applications or functions on the communications device by various techniques.

In some examples, the type of data files that can be exchanged within a private text chat session are limited to data files that can be processed only by trusted applications or processes on the remote electronic communications devices. These data file types may be limited to, for example, data files containing image data that can be processed by functions intrinsic to the device's operating system. Limiting the types of data files that can be exchanged in some examples provides assurances that the data file is not stored, copied, used in an unauthorized way, or combinations of these, when that data file is received by the remote device. In various examples, limitations may be imposed on the ability to copy or otherwise use private text chat messages and data exchanged in association with a private text chat session. For example, copying may be prohibited, or the other user may be notified of attempts to copy such data. Further, when the remote user is notified of an attempt to copy, the remote user may have to provide explicit authorization to copy or otherwise use the data before that data may be copied or used by a particular device.

The users of the caller device 202 and the called party device 204 in some examples are able to conduct the private text chat session for as long as they want. One user participating in the private text chat session will generally select to terminate the private text chat session. In some examples, either the caller device 202 is able to terminate the session 232 or the called party device 204 is able to terminate the session 254. Various interface options are able to be presented to a user of these respective devices to terminate the private text chat session, such as menu options, simply closing the dedicated user interface, other techniques, or combinations of these. Terminating the session includes sending a private text chat session termination message 278 from the device originating the termination to the other device.

In some examples, after termination of the private text chat session, the device continues to display the dedicated user interface until the user explicitly closes the dedicated user interface 234, 256. Prior to closing the dedicated user interface, the user is able to view the private text chat messages and any data that was exchanged during the private text chat session. The user of the caller device 202 is able to close the dedicated user interface 234 independently of the actions of the user of the called party device 204 to close the dedicated user interface 256. This allows each user to retain the private text chat messages and any exchanged data for review for as long as the user desires. In some examples, a user is able to close the dedicated user interface during the private text chat session. When a user closes the dedicated user interface during the private text chat session, this action is able to be interpreted as a command to terminate the session, and a private text chat session termination message 278 is sent in response to that action.

When the user of the caller device 202 closes the dedicated user interface in some examples, the caller device 202 and the called party device 204 react to that action by deleting the private text and any data exchanged during the private text chat session 236, 258. Once the dedicated user interface is closed and the exchanged private text and data are deleted on the respective devices, the other chats which were closed upon creation of the private text chat session are restored 238, 260.

In other examples, which may be configured for each private text chat session, based on global configurations, configured for certain remote parties with whom private text chat session are conducted, based on other configurations, or combinations of these, when one user selects to terminate a private text chat session, the session is immediately closed on all devices participating in the session. For example, when one party selects to terminate the private text chat session, that party's device closes the user interface for that session and deletes all data associated with the private text chat session. That device further sends the private text chat session termination message 278 to the other device participating in the session, and the device receiving that termination message automatically close the user interface for the private text chat session and deletes all data associated with the session. This is analogous to a party in a voice call hanging up, thereby ending the voice call.

Figure 3:
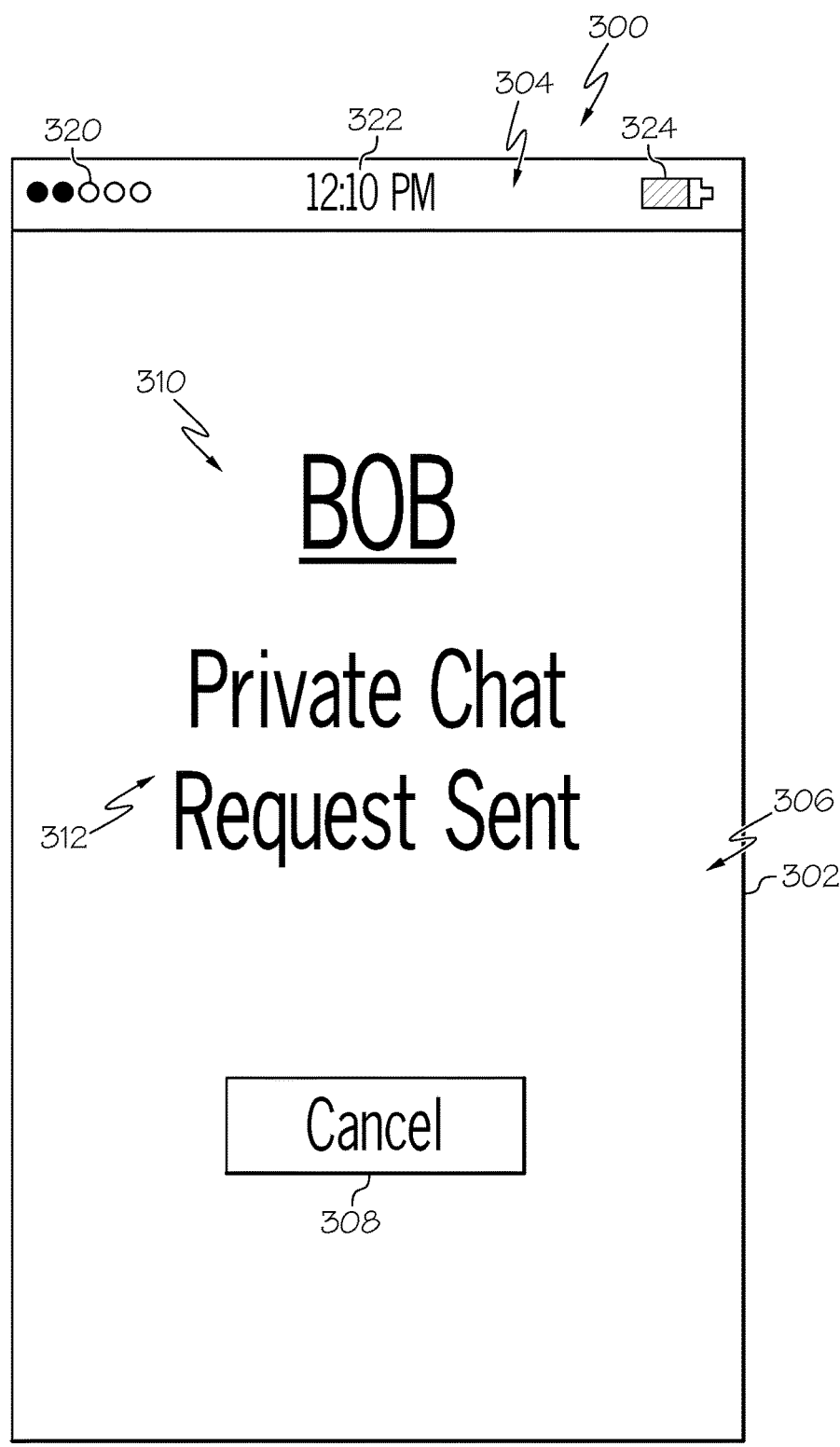
FIG. 3 illustrates an example pending request screen, according to an example.

FIG. 3 illustrates an example pending request screen 300, according to an example. As discussed above, the devices of some examples operate to reduce or inhibit other user interface activity once a private text chat session is being started. In an example, once a user of a caller device 202, as is described above, initiates a request to create a private text chat session, the display of the device in some examples is used to exclusively present a pending request screen, such as the depicted example pending request screen 300. The example pending request screen 300 is an example of a notification provided on a display of an electronic communications device, such as on the display screen 132 of the first electronic communications device 104 described above, used to participate in a private text chat session. In further examples, other user interface displays and user input/output techniques are able to be used to inform the user of the pending request and to, if desired based on operational designs, reduce or inhibit other user interface activity with the device.

The example pending request screen 300 depicts a display 302 of a communications device that presents a pending request image 306 that occupies almost the entire display 302. In addition to the pending request image 306, the display 302 of this example also presents a notification bar 304 that includes a received signal strength indicator 320, a time of day display 322, and a battery charge indicator 324. In some examples, the amount of information presented in the notification bar 304 is able to be reduced during a private text chat session, including during the display of the pending request image 306.

The example pending request screen 300 includes a called party indication 310, which indicates the user associated with the device to which the private text chat session request was sent. A pending request indication text 312 is also presented, along with a Cancel button 308. In some examples, a user's pressing of the cancel button operates to terminate the private text chat session, which can occur before or after the called party responds to accept or decline the request.

Figure 4:
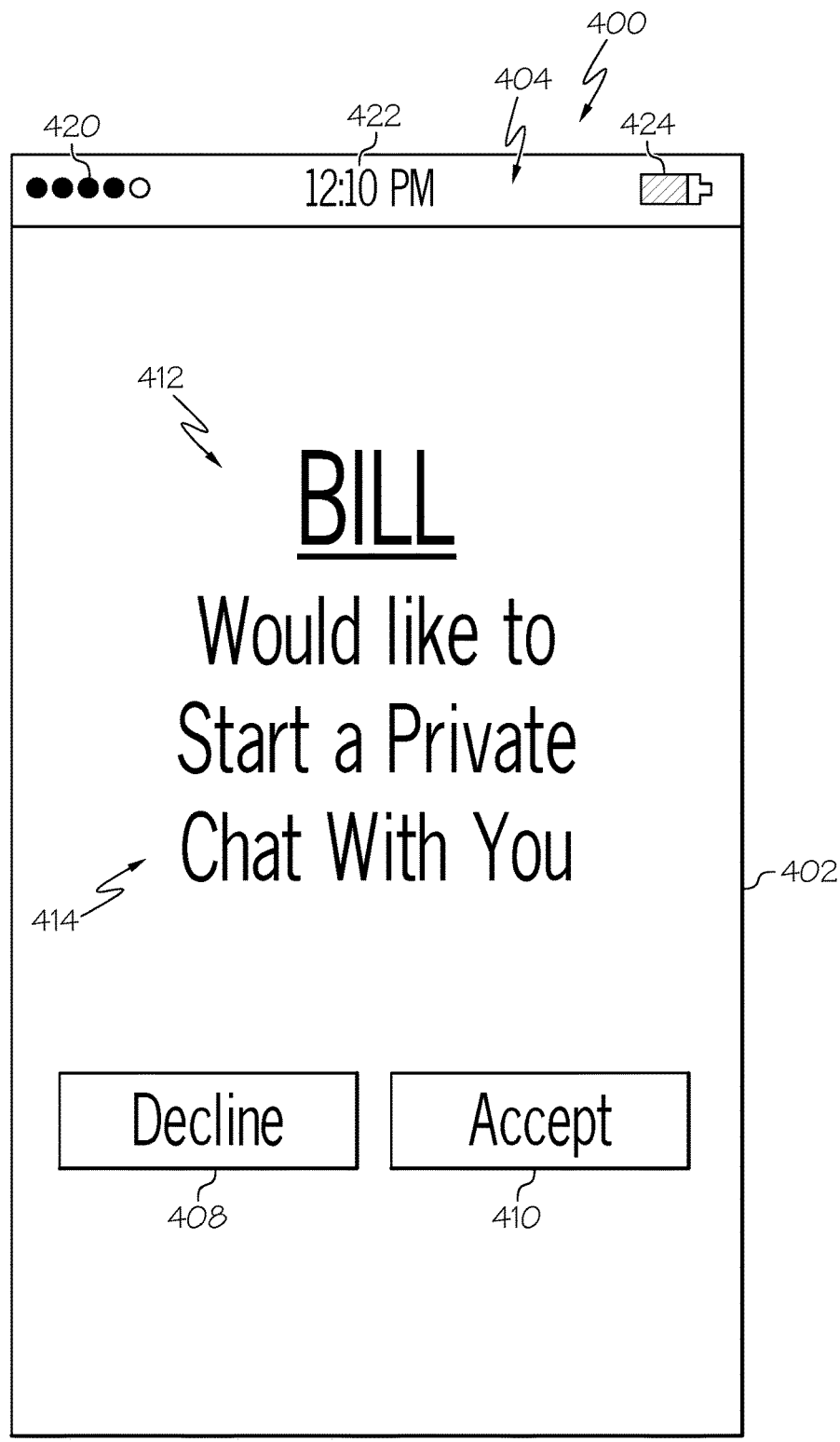
FIG. 4 illustrates an example request received screen, according to an example.

FIG. 4 illustrates an example request received screen 400, according to an example. The example request received screen 400 is an example of a notification that a private text chat session request message has been received. The example request received screen 400 is an example of a notification provided on a display of an electronic communications device, such as on the display screen 132 of the first electronic communications device 104 described above, used to participate in a private text chat session. In a manner similar to that discussed above with respect to the example pending request screen 300, user interface activity is also able to be reduced or inhibited on a called party device 204 as soon as a private text chat session is received.

In the illustrated example request received screen 400, the display 402 of the device in is used to exclusively present a request received screen, such as the depicted example request received screen 400. In a manner similar to that discussed above with regards to the example pending request screen 300, further examples are able to use other user interface displays or user input/output techniques to inform the user of the received request and to, if desired based on operational designs, reduce or inhibit other user interface activity with the device.

The example request received screen 400 depicts a display 402 of a communications device that presents a request received image 406 that occupies almost the entire display 402. Similar to the example pending request screen 300 discussed above, the display 302 also presents a notification bar 404 that includes a received signal strength indicator 420, a time of day display 422, and a battery charge indicator 424. In some examples, the amount of information presented in the notification bar 404 is able to be reduced during a private text chat session, including during the display of the request received image 406.

The example request received screen 400 includes a called party indication 412, which indicates the user associated with the device that sent the private text chat session request. A request received indication text 414 is also presented, along with a Decline button 408 and an Accept button 410. If the called party presses the Accept button 410 of the example request received screen 400, a private text chat session acceptance message is sent to the caller device 202 and a private text chat session is started on the called party device. If the called party presses the Decline button 408 of the example request received screen 400, in one example a private text chat session rejection message is sent to the caller device 202, the example request received screen 400 is removed from the display, and the operation of the called party device 204 resumes to the state before the private text chat session request was received.

In the event that the user of the caller device 202 cancelled the request before the user of the called party device 204 accepts the request, the called party device 204 receives a message indicating that the request was cancelled. Based on receiving that message, the display of the request received image 406 is able to be removed from the display 402 and the operation of the called party device resumes to the state before the private text chat session request was received.

In some examples, notifications of a received private text chat session request are able to be accompanied by audio notifications. In some examples, the audio notification is able to be the same as used to notify the receipt of any other received text message so as to not indicate to others in the area that a request for a special, private text chat session has been received. In some examples, the notification of a receipt of a private text chat session request is able to be notified in the same manner as the receipt of another text message, with no extra visual or audio indications being provided other than some distinctive visual display indicators such as some text within the notification, special colors in the notification, other discrete indications, or combinations of these.

Figure 5:
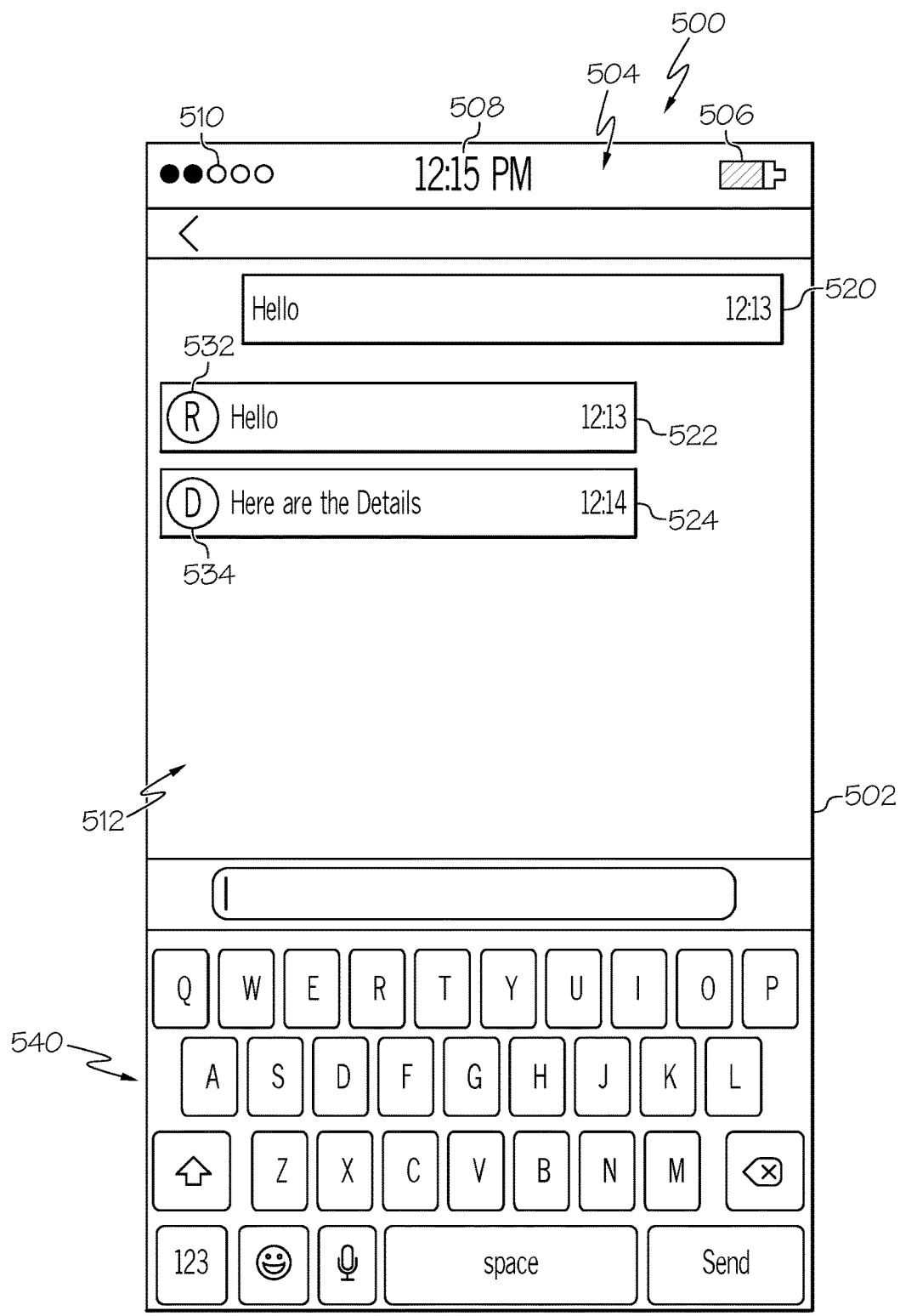
FIG. 5 illustrates an example dedicated private text chat session user interface, according to an example.

FIG. 5 illustrates an example dedicated private text chat session user interface 500, according to an example. The example dedicated private text chat session user interface is an example of a full screen user interface display presented on a communications device during a private text chat session, such as on the display screen 132 of the first electronic communications device 104 described above. In some examples, the same dedicated private text chat session user interface is displayed during private text chat sessions on both the caller device 202 and the called party device 204. The dedicated private text chat session user interface 500 depicts a display 502 and a keyboard 540 that are user interface components of a communications device. The keyboard 540 of various examples is able to be a dedicated hardware keyboard or a virtual keyboard displayed on a portion of the display screen of the communications device, such as the display screen 132 described above.

The example dedicated private text chat session user interface 500 includes a notification bar 504 that is similar to that discussed above with regards to the example pending request screen 300 and example request received screen 400. The notification bar 504 includes a received signal indicator 510, a time of day display 508, and a battery charge indicator 506. As is also discussed above, the notification bar 504 displayed in the example dedicated private text chat session user interface 500 is able to include reduced information relative to the notification bar displayed during other operations of the device. For example, notifications of a receipt of other text chat messages that are not part of the private text chat session are able to not be presented in the notification bar 504 presented in the example dedicated private text chat session user interface 500.

The illustrated example dedicated private text chat session user interface 500 also includes a message display field 512. The message display field 512 in this example consumes the entire display 502 except for the notification bar 504. In this example, the message display field 512 extends over most of the usable area of the display 502 not used for the notification bar 504. As is discussed above, the devices of some examples operate to reduce or inhibit other user interface activity during private text chat sessions. The use of such a large message display field 512 is able to inhibit or restrict the user from using other applications or functions of the electronic device during a private text chat session.

The message display field 512 is an area used to display private text chat messages or other data that is exchanged during a private text chat session. The illustrated example dedicated private text chat session user interface 500 presents private text chat messages entered at the different devices engaged in the private text chat session by showing the private text chat messages entered by each user on different sides of the message display field 512. In the illustrated example, private text chat messages entered by the local party using that device are shown on the left side of the message display field 512, and private text chat messages entered by a remote party using another device are displayed on the right side of the message display field 512. In some examples, private messages displayed in the message display field 512 do not include identifiers of the device, or associated individual, that sent the message. Not displaying such identifiers enhances the privacy and anonymity of the information exchanged within the private text chat session, such as by persons viewing the screen or otherwise capturing what is displayed thereon.

In some examples, private text chat sessions are able to be conducted with more than two participants. In one such example, the text chat messages entered locally are displayed on the left side of the screen, while text chat messages received from the two or more other remote devices are displayed in the right side of the screen. Since the private text chat messages of the private text chat session are displayed without indicia, such as text or avatar indicators, of the parties involved in the conversation, in one example messages received from other remote devices are distinguished to reflect which device sent each message without providing an explicit indicator of an individual associated with that device, for example, messages from each particular device are able to be displayed with a color that is different than colors used to display messages from other remote devices.

The example dedicated private text chat session user interface 500 is displayed on a called party device, such as the display 132 of a first electronic communications device 104 acting as a called party device 204 discussed above, after receiving a user input to accept the private text chat session request. The message display field includes a first caller party message 520, which is merely a greeting to start the conversation that was entered by the user of the other device and sent to this device. The first caller party message 520 is a message entered by the user of the caller device and is thus displayed on the right side of the message display field with the time of transmission of that private text message. Other than the position of the displayed message on the right side of the message display field 512, there is no indication of the device or associated individual that was the source of the message.

In response to the first caller message 520, the local user of the called party device sends two private text chat messages, a first called party message 522 that is a greeting and a second called party message 524 that conveys more information. These text chat messages are entered onto and sent to the remote device by the local device that is displaying the dedicated private text chat session user interface 500, and are thus presented on the left side of the message display field 512 along with their time of receipt. It is also noted that other than the position of the displayed message on the left side of the message display field 512, there is no indication of the device or associated individual that was the source of those message.

The messages that are sent to the remote device are also displayed in the message display field 512 in some examples with message delivery/read indicators, such as the illustrated read indicator 532 of the first called party message 522 and the delivered indicator 534 of the second called party message 524. When the message is received by the remote destination device, the destination device responds to the sending device with a message indicating that the message has been successfully "delivered" to the destination device. Upon receipt of message indicating successful delivery, the display of the message on the sending device includes a "delivered" indicator. When that message is displayed to the user of the destination device, the destination device sends another message indicating that the user of the destination device has "read" the message. Upon receipt of a message indicating display of the message, or the implied "reading" of the message by the destination user, the display of the message on the sending device includes a "read" indicator.

In some examples, a user in a private text chat session is able to close or otherwise "move away from" or otherwise not be actively engaged with the user interface for the private text chat session and perform other activities, such as responding to a voice call. When the user is not actively engaged with the interface for the private text chat session, the receiving device sends the messages indicating successfully "delivery," but not indicting that the message has been "read." As depicted in the dedicated private text chat session user interface 500, the first called party message 522 has a "read" indicator 532 indicating that the message has been read. This is a result of the user of the remote device being actively engaged with the user interface for the private text chat session when the first called party message 522 was displayed. The second called party message 524 has a "delivered" indicator 532 indicating that the message has been successfully delivered, but not yet read. This is a result of the user of the remote device not being actively engaged with the user interface for the private text chat session when the second called party message 524 was received and attempted to be displayed.

As described above in regards to the sequence diagram for a private text chat session 200, in some instances initial text chat messages are sent 250 by a called party device 204 prior to the caller device 202 receiving the private text chat session acceptance message 272. In the event of the private text chat session acceptance message 272 being delayed, the initial text chat messages are able to be received by the caller device 202 before the private text chat session acceptance message 272 is received. In such a situation, the caller device 202 continues to display the example pending request screen 300, and store the received initial text chat messages until the private text chat session acceptance message 272 is received. These initial text chat messages are displayed on the sending device, in appropriate examples, with a "delivered" indicator. Once the private text chat session acceptance message 272 is received and the initial text chat messages are displayed, a dedicated private text chat session user interface containing the initial text chat messages replace the example pending request screen 300 on the caller device, and the display of the initial text chat messages on the sending, called party, device are displayed with a "read" indicator.

Figure 6A:
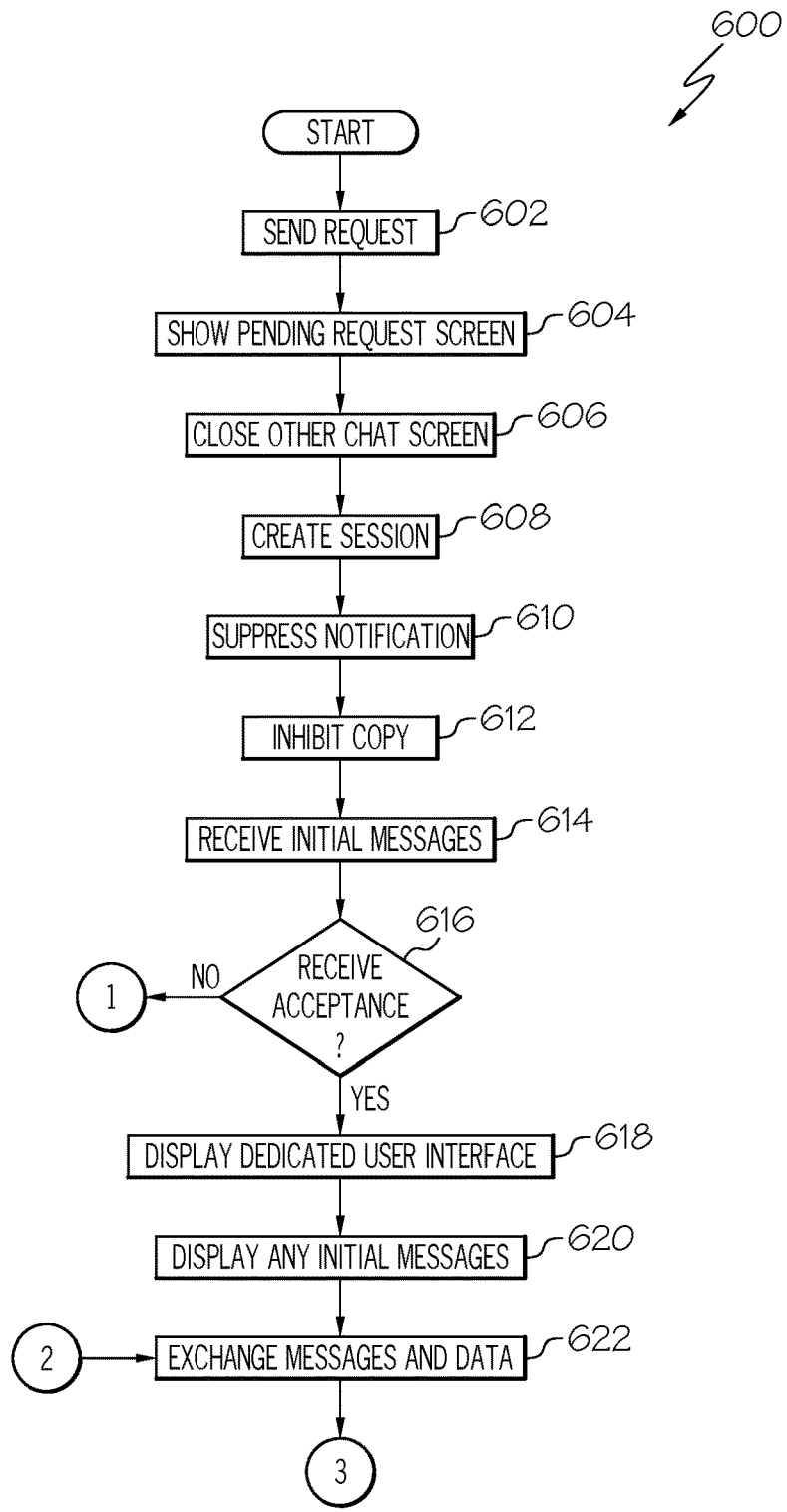
FIGS. 6A and 6B illustrate a private text chat session caller processing flow, according to an example.
Figure 6B:
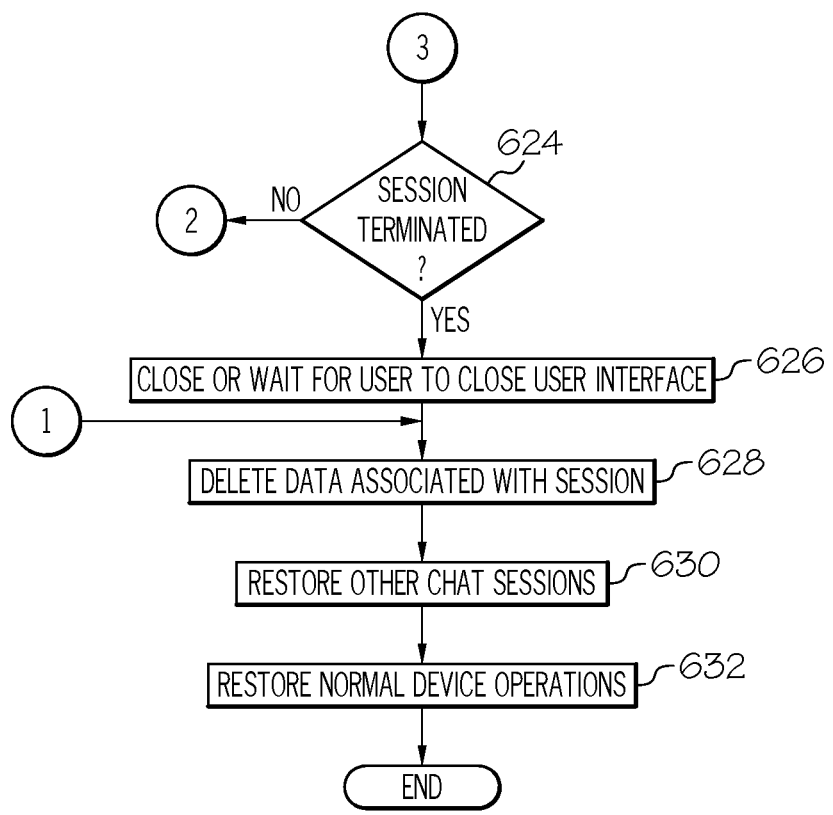

FIGS. 6A and 6B illustrate a private text chat session caller processing flow 600, according to an example. The private text chat session caller processing flow 600 is an example of a process to perform the sequences described above with regards to the caller device 202. This example processing flow depicts aspects of the process to create, maintain and terminate a private text chat session. In addition to the aspects described below, a private text chat session caller process flow 600 is able to include other aspects and functions while obtaining similar results as those described below.

With reference to FIG. 6A, the private text chat session caller processing flow 600 includes sending, at 602, a request to create a private text chat session. In one example, the request is sent to a called party device such as is described above based on an input from a user indicating a request to establish a private text chat session with the user of the destination device.

As is also described above, once a user of a caller device has started the creation of a private text chat session, the device operates to reduce or inhibit other user interface activity. As depicted for the illustrated private text chat session caller processing flow 600, a pending request screen is shown, at 604, on a display of the device to indicate the pending request to a user. An example pending request screen 300 is described above. The other chat sessions, such as SMS Chat sessions, other BlackBerry Messenger (BBM) chat sessions, chat sessions of other applications and services, or combinations of these, are closed, at 606.

A private text chat session programming object is created, at 608. The private text chat session programming object in some examples is able to be implemented as an object or other programmatic structure, data structure, or both, that is used to associate various data and conditions associated with the private text chat session. For example, all private text chat messages and any data that is exchanged as part of the private text chat session is associated with the private text chat session programming object. Upon termination of the private text chat session, all such associated data and other elements are able to be deleted to maintain the security and privacy of the exchange.

Notifications of other events occurring on the device are suppressed, at 610. The suppression performed by various examples are able to include completely blocking notifications of any events, blocking notifications of only some events while providing different, less intrusive, indications of the notifications for other events, any other modification as to the types or classes of notifications that are indicated to a user, any other modification of indications of all or a sub-set of notifications that are to be provided to the user, any other modification of notifications, or combinations of these.

Copying of information exchanged during the private text chat session is inhibited, at 612. Inhibiting copying of information is able to include prohibiting copying or screen capturing of any private text chat messages exchanged during the private text chat session, allowing copying or screen captures but providing an indication to the other party in the private text chat session that such capturing is being performed, allowing screen captures but providing an indication to the other party that such capturing is being performed and requiring the other party to provide a response to allow such screen capturing, prohibiting an ability to store data, such as data files, exchanged during the private text chat session, allowing the storage of data exchanged but notifying the other party that the data is being stored, allowing the storage of data exchanged but notifying the other party that the data is being stored and requiring the other party to provide a response to allow storing the data, any other form of inhibiting copying, or combinations of these.

In one example, once a private text chat session is created, the device is able to receive initial text chat messages, at 614. As described above, initial text chat messages are messages sent from a called party device 204 before the caller device 202 receives an acceptance message for a requested private text chat session. Such messages are able to be stored without being displayed until receipt of the acceptance message for the requested private text chat session.

A determination is then made, at 616, as to whether an acceptance message for the private text chat session request has been received from the device to which the request was sent. An acceptance message is able to be determined to not have been received in some examples based on either a receipt of a message explicitly declining the private text chat session, or based upon an expiration of a timeout period after sending the request, at 602, as described above. If it is determined that an acceptance has not been received, the private text chat session is terminated as is illustrated in FIG. 6B. Referring to FIG. 6B, terminating the private text chat session includes deleting, at 628, data associated with the private text chat session. Other chat sessions are also restored, at 630. Normal device operations are restored, at 632. Normal device operations include, for example, restoring providing full notification indications, allowing copying of data and screen captures according to normal device configurations, restoring any other operating characteristics that were modified by upon the initial configuration of the private text chat session, restoring any other characteristics or parameters, or combinations of these.

Returning to FIG. 6A and determining if acceptance of the private text chat session request is accepted, at 616, a private text chat session is conducted if an acceptance is determined to have been received. A dedicated user interface, such as the example dedicated private text chat session user interface 500, is displayed, at 618. Any initial text chat messages, which were received at 614, are displayed in the dedicated user interface, at 620.

Once the dedicated user interface is displayed along with any received initial text chat messages, the parties in the private text chat session are able to exchange messages and data, at 622. The exchange of messages and data generally constitutes the main point of the private text chat session from the user's perspective. As discussed above, private text chat messages are able to be exchanged as part of the private text chat session. Data, such as image files, video files, application data files such as word processing or spreadsheet files, other data, or combinations of these, are also able to be exchanged during the private text chat session. In some examples, the types of data files that are able to be exchanged are limited to those that can be processed by trusted applications, such as internal functions of the device's operating system.

Referring now to FIG. 6B, a determination is made, at 624, if the private text chat session is terminated. In some examples, either party is able to initiate the termination of the private text chat session. In some examples, several techniques are available to a user to terminate the private text chat session. For example, an explicit user interface facility, such as an "End Private Chat" button is able to be presented in the dedicated user interface for the private text chat session. Selecting this button will terminate the private text chat session. In other examples, merely closing the private text communications application through the device's normal user interface techniques will terminate the private text chat session. In general, once one party of the private text chat session selects to terminate the private text chat session, messages are exchanged between the participating devices to cause all devices participating in the private text chat session to determine, at 624, that the private text chat session is terminated. If the private text chat session is not terminated, messages and data are continued to be exchanged, at 622 as is described in FIG. 6A.

If a determination is made that the private text chat session is terminated, in some examples, the process waits, at 626, for the user of the device to close the dedicated user interface used for the private text chat session. This allows the user to view portions of the conversation after the private text chat session has terminated. In some other examples, however, the dedicated user interface is automatically closed upon termination of the private text chat session. Such automatic closing of the dedicated user interface is able to be performed directly after termination of the private text chat session, after a delay, at any time, or combinations of these which may be configured for the device.

In one example, after the user closes the dedicated user interface, the private text chat session is terminated. The process described above is performed to terminate the private text chat session, including deleting, at 628, data associated with the private text chat session. Other chat sessions are also restored, at 630. Normal device operations, as are describe above, are restored, at 632. The private text chat session caller processing flow 600 then ends.

Figure 7:
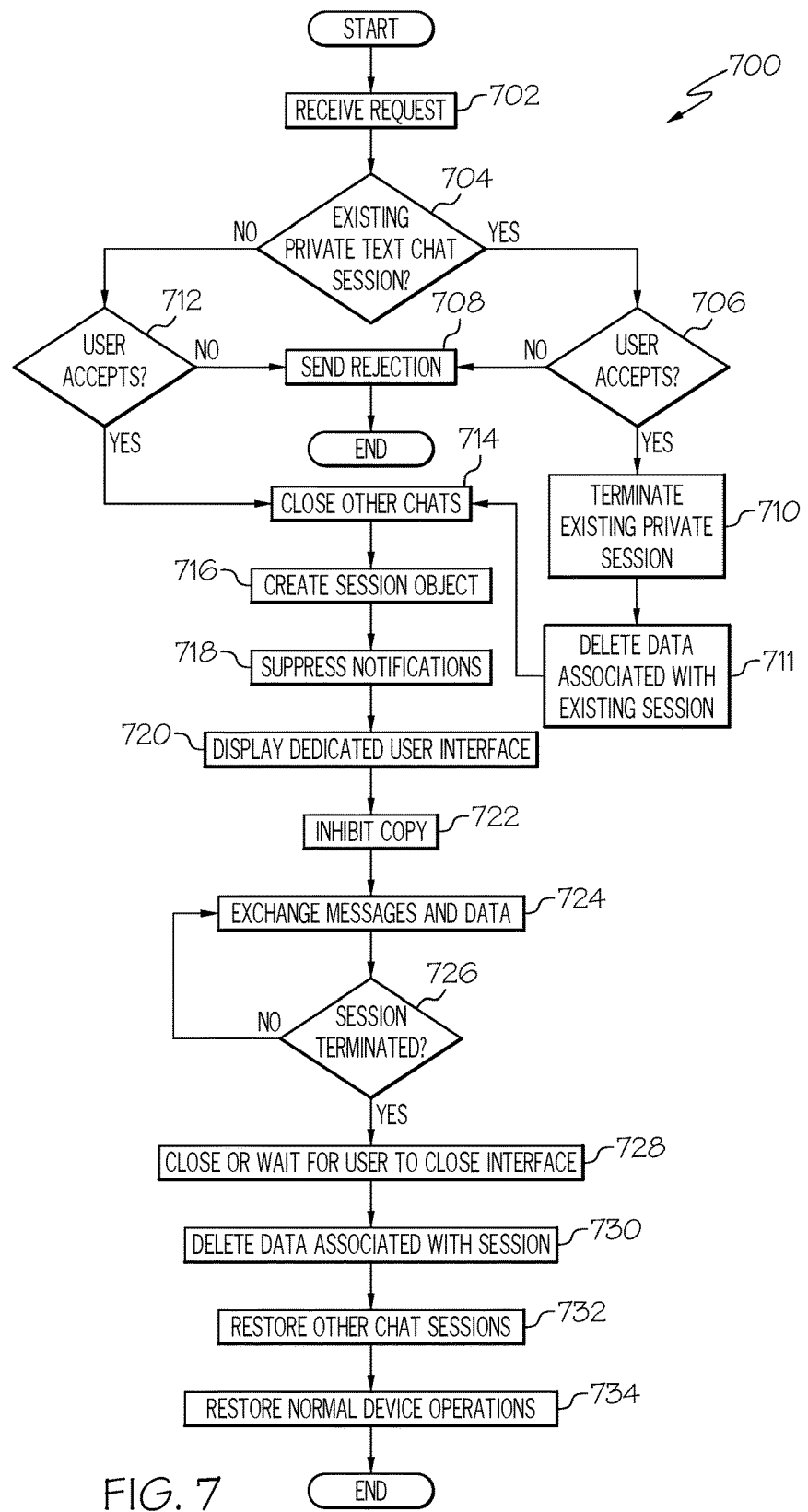
FIG. 7 illustrates a private text chat session called party processing flow, according to an example.

FIG. 7 illustrates a private text chat session called party processing flow 700, according to an example. The private text chat session called party processing flow 700 is an example of a process to perform the sequences described above with regards to the called party device 204. This example processing flow depicts aspects of the process to create, maintain and terminate a private text chat session. In addition to the aspects described below, a private text chat session called party process flow 700 is able to include other aspects and functions while obtaining similar results as those described below.

The private text chat session called party processing flow 700 includes receiving, at 702, a request to create a private text chat session. In one example, the request is received from a caller party device performing the private text chat session caller processing flow 600 such as is described above.

The private text chat session called party processing flow include determining, at 704, if an existing private text chat session is established on the called party device 204. If an existing private text chat session is established, the user of the device is engaged in a private text chat session and may or may not want to interrupt the existing session to establish the private text chat session requested by the newly received request. In the even that there is an existing private text chat session established on the called party device 204, a determination is made, at 706, if the user wants to accept the newly received private text chat session request. In an example, this determination includes providing the user with a separate user interface, such as a pop-up box or other suitable notification, of the newly received private text chat session request and allowing the user to provide an input to either accept or reject the newly received request. In some examples, if a user does not respond to the notification of the newly received request, such a lack of response is interpreted as the user not accepting the request.

If it is determined, at 706, that the user selects to not accept the request, a private text chat session rejection message is sent to the requesting device, at 708. If the user selects to accept, at 706, the existing private text chat session is terminated, at 710. In some examples, terminating an existing private text chat session to accept a request for a new private text chat session involves deleting, at 711, data associated with the existing private text chat session.

Returning to the determination of an existing private text chat session at 704, if it is determined that there is not an existing private text chat session, a determination is made, at 712, as to whether the user of the device receiving the private text chat session request accepts the request. Such a determination is able to include presenting a user interface, such as the example request received screen 400 described above, to allow the user to provide an input indicating the selection. In some examples, notifications provided to indicate receipt of a private text chat session are able to be the same used to indicate receipt of any other text messages in order to not indicate to others in the area of a receipt of a special request. If the user does not select to accept the example request received screen request, either based on the determination at 712 or 706, a message is sent, at 708, to the requesting device explicitly rejecting the request. The private text chat session called party processing flow 700 then terminates.

If the user accepts the request, as determined at 712, or after data of an existing example request received screen is deleted, at 711, a private text chat session is established. Once a private text chat session is established, the processing for the private text chat session called party processing flow 700 is similar to that discussed above with regards to the private text chat session caller processing flow 600. For example, other chat sessions, such as SMS Chat sessions, other BlackBerry Messenger (BBM) chat sessions, chat sessions of other applications and services, or combinations of these, are closed, at 714. A private text chat session programming object is created, at 416. As described above, the private text chat session programming object in some examples is able to be implemented as an object or other programmatic structure, data structure, or both, that is used to associate various data and conditions associated with the private text chat session. For example, all private text chat messages and any data that is exchanged as part of the private text chat session are associated with the private text chat session programming object. Upon termination of the private text chat session, all such associated data and other elements are able to be deleted to maintain the security and privacy of the exchange.

Notifications of other events occurring on the device are suppressed, at 718. As described above, the suppression performed by various examples are able to include completely blocking notifications of any events, blocking notifications of only some events while providing different, less intrusive, indications of the notifications for other events, any other modification as to the types or classes of notifications that are indicated to a user, any other modification of indications of all or a sub-set of notifications that are to be provided to the user, any other modification of notifications, or combinations of these.

A dedicated user interface, such as the example dedicated private text chat session user interface 500, is displayed, at 720. Copying of information exchanged during the private text chat session is inhibited, at 722. As described above, inhibiting copying of information is able to include prohibiting copying or screen capturing of any private text chat messages exchanged during the private text chat session, allowing copying or screen captures but providing an indication to the other party in the private text chat session that such capturing is being performed, allowing screen captures but providing an indication to the other party that such capturing is being performed and requiring the other party to provide a response to allow such screen capturing, prohibiting an ability to store data, such as data files, exchanged during the private text chat session, allowing the storage of data exchanged but notifying the other party that the data is being stored, allowing the storage of data exchanged but notifying the other party that the data is being stored and requiring the other party to provide a response to allow storing the data, any other form of inhibiting copying, or combinations of these.

The parties in the private text chat session are able to exchange messages and data, at 724. This is where the private text chat session is conducted from the user's perspective. As discussed above, private text chat messages are able to be exchanged as part of the private text chat session. Data, such as image files, video files, application data files such as word processing or spreadsheet files, other data, or combinations of these, are also able to be exchanged during the private text chat session. As discussed above, in some examples the types of data files that are able to be exchanged within a private text communication session are limited to those that can be processed by trusted applications, such as internal functions of the device's operating system.

A determination is made, at 726, if the private text chat session is terminated. As discussed above, any party in the private text chat session is able to initiate termination of the private text chat session through a variety of user interface facilities, and messages are sent to the other device to effect that termination. If the private text chat session is not terminated, messages and data are continued to be exchanged, at 724.

If a determination is made that the private text chat session is terminated, in some examples, the process waits, at 728, for the user of the device to close the dedicated user interface used for the private text chat session. As described above, this allows the user to view portions of the conversation after the private text chat session has terminated. In some examples, the dedicated user interface is automatically closed upon termination of the private text chat session. Such automatic closing of the dedicated user interface is able to be performed directly after termination of the private text chat session, after a delay, at any time, or combinations of these which may be configured for the device.

In one example, after the user closes the dedicated user interface, the private text chat session is terminated. Terminating the private text chat session is able to include, for example, deleting, at 730, data associated with the private text chat session. Other chat sessions are restored, at 732, and normal device operations are restored, at 734. The private text chat session called party processing flow 700 then ends.

Figure 8:
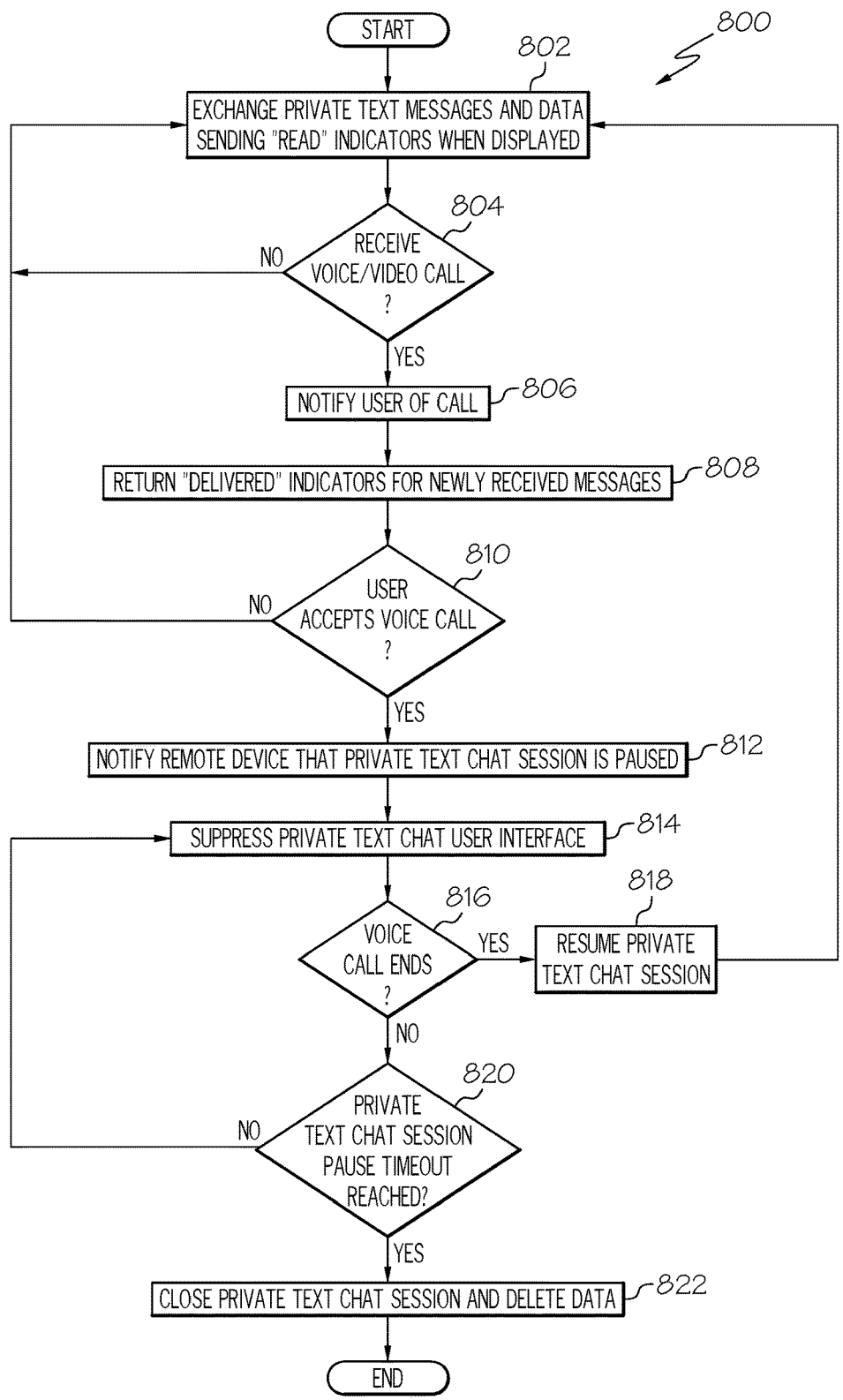
FIG. 8 illustrates a private text chat session interruption process, according to an example.

FIG. 8 illustrates a private text chat session interruption process 800, according to an example. The private text chat session interruption process 800 is an example of an occurrence of an event that is able to interrupt a private text chat session. As discussed above, the private text chat session is intended to be a focused communications session that is not disturbed while being conducted, such as by distractions caused by notifications of events occurring on the device. In some examples, however, devices are configured to allow interruption of private text chat session by some events, such as in incoming voice or video call.

The private text chat session interruption process 800 depicts an interruption event, such as an incoming voice call, that occurs while users are exchanging private text chat messages and data during a private text chat session. Examples of exchanging such private text chat messages and data are described above for exchanging messages and data 622 of the private text chat session caller processing flow 600 and exchanging messages and data 724 of the private text chat session called party processing flow 700.

The private text chat session interruption process beings during exchanging data, at 802, with "read" indicators being returned to the sending device for received private text chat messages according to the processes described above. A determination is made, at 804, as to whether a voice or video call request has been received. If no such request has been received, the data continues to be exchanged, at 802.

When a voice call or a video call has been received, at 804, the user is notified of the received call request, at 806. The private text chat session is then interrupted. This interruption causes the device to return, at 808, "delivered" indicators for received messages to be returned to the device sending private text chat messages since the user is assumed to not be reading those messages while handling the incoming voice call. A determination is made, at 810, if the user accepts the voice or video call. If the user does not accept the incoming voice call, exchanging private text chat messages and data in the private text chat session is resumed, at 802.

Returning to the decision at 810, if the user accepts the incoming voice or video call, the user's device notifies the remote device that the private text chat session is paused, at 812. In one example, the dedicated user interface for the private text chat session is suppressed, at 814, during the voice or video call. A determination is made, at 816, if the voice call has ended. Voice calls usually end based on the action of one party ending the call, such as by "hanging up." If the voice call is determined to have ended, the private text chat session is resumed, at 818, and the exchange of private text chat messages and data continues, at 802.

In some examples, a private text chat session can only be paused for an interruption, such as a received voice call or video call, for a certain time limit, which is reflected by a private text session pause timeout. Particular devices are able to be configured with different time limits for pausing, and various actions can be taken upon expiration of that time limit. In various examples, notifications are able to be provided during the voice call as the time limit is being approached. For example, audible beeps are able to be provided to the user of the device whose private text chat session was interrupted at certain time durations before the actual expiration of the time limit.

Returning to the determination, at 816, if it is determined that the voice call has not ended, a determination is made, at 820, if a private text session pause timeout has been reached. If it is determined that this timeout has not been reached, the user interface for the private text communication session is continued to be suppressed, at 814, and the voice call proceeds. In this example, upon determining that the private text session timeout has been reached, the private text chat session is closed, at 822, and all data associated with that session is deleted. The process then ends.

Figure 9:
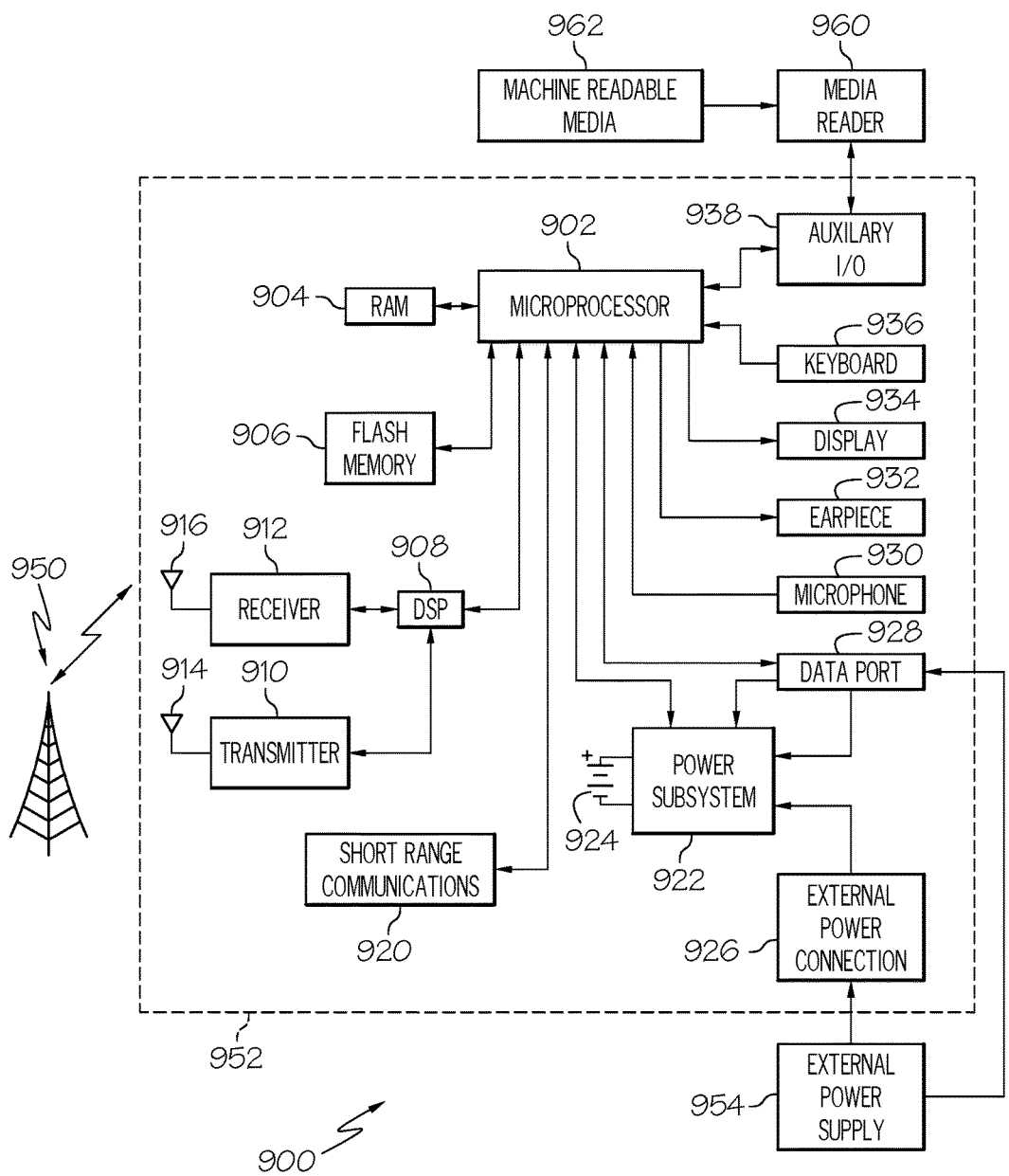
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. In this example, an electronic device 952 is also a wireless two-way communication device with voice, text chat, and data communication capabilities. Such electronic devices communicate with a wireless voice, text chat, or data network 950 using a suitable wireless communications protocol. Wireless voice communications are performed using either an analog or digital wireless communication channel Data communications allow the electronic device 952 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 952 is an example electronic device that includes two-way wireless communications functions. Such electronic devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communications protocols with which the device is intended to operate.

The electronic device 952 includes a microprocessor 902 that controls the overall operation of the electronic device 952. The microprocessor 902 interacts with the above described communications subsystem elements and also interacts with other device subsystems such as flash memory 906, random access memory (RAM) 904, auxiliary input/output (I/O) device 938, data port 928, display 934, keyboard 936, earpiece 932, audio sound reproduction system 970, microphone 930, a short-range communications subsystem 920, a power subsystem 922, other subsystems, or combinations of these.

One or more power storage or supply elements, such as a battery 924, are connected to a power subsystem 922 to provide power to the circuits of the electronic device 952. The power subsystem 922 includes power distribution circuitry for providing power to the electronic device 952 and also contains battery charging circuitry to manage recharging the battery 924 (or circuitry to replenish power to another power storage element). The power subsystem 922 receives electrical power from external power supply 954. The power subsystem 922 is able to be connected to the external power supply 954 through a dedicated external power connector (not shown) or through power connections within the data port 928. The power subsystem 922 includes a battery monitoring circuit that is operable to provide a status of one or more battery status indicators, such as remaining capacity, temperature, voltage, electrical current consumption, and the like, to various components of the electronic device 952.

The data port 928 is able to support data communications between the electronic device 952 and other devices through various modes of data communications, such as high speed data transfers over an optical communications circuits. Data port 928 is able to support communications with, for example, an external computer or other device. In some examples, the data port 928 is able to include electrical power connections to provide externally provided electrical power to the electronic device 952, deliver electrical power from the electronic device 952 to other externally connected devices, or both. Data port 928 of, for example, an electronic accessory is able to provide power to an electronic circuit, such as microprocessor 902, and support exchanging data between the microprocessor 902 and a remote electronic device that is connected through the data port 928.

Data communication through data port 928 enables a user to set preferences through the external device or through a software application and extends the capabilities of the device by enabling information or software exchange through direct connections between the electronic device 952 and external data sources rather than via a wireless data communication network. In addition to data communication, the data port 928 provides power to the power subsystem 922 to charge the battery 924 or to supply power to the electronic circuits, such as microprocessor 902, of the electronic device 952.

Operating system software used by the microprocessor 902 is stored in flash memory 906. Further examples are able to use a battery backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904.

The microprocessor 902, in addition to its operating system functions, is able to execute software applications on the electronic device 952. A set of applications that control basic device operations, including at least data and voice communication applications, is able to be installed on the electronic device 952 during manufacture. In an example, programs and other data used to support creating, maintaining, and terminating private text chat sessions, as are described above, are able to be installed in the memory of the electronic device 952. Further examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 952 through, for example, the wireless network 950, an auxiliary I/O device 938, Data port 928, short-range communications subsystem 920, or any combination of these interfaces. Such applications are then able to be installed by a user in the RAM 904 or a non-volatile store for execution by the microprocessor 902.

In a data communication mode, a received signal such as a text message or web page download is processed by the communication subsystem, including wireless receiver 912 and wireless transmitter 910, and communicated data is provided the microprocessor 902, which is able to further process the received data for output to the display 934, or alternatively, to an auxiliary I/O device 938 or the Data port 928. A user of the electronic device 952 may also compose data items, such as e-mail messages, using the keyboard 936, which is able to include a complete alphanumeric keyboard or a telephone-type keypad, in conjunction with the display 934 and possibly an auxiliary I/O device 938. Such composed items are then able to be transmitted over a communication network through the communication subsystem.

For voice communications, overall operation of the electronic device 952 is substantially similar, except that received signals are generally provided to an earpiece 932 and signals for transmission are generally produced by a microphone 930. Alternative voice or audio I/O subsystems, such as a voice message recording subsystem, may also be implemented on the electronic device 952. Although voice or audio signal output is generally accomplished primarily through the earpiece 932, the display 934 may also be used to provide an indication of the identity of a calling party, the duration of a voice call, or other voice call related information, for example.

Depending on conditions or statuses of the electronic device 952, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 920 provides for data communication between the electronic device 952 and different systems or devices, which need not necessarily be similar devices. For example, the short-range communications subsystem 920 includes an infrared device and associated circuits and components or a Radio Frequency based communication module such as one supporting Bluetooth® communications, to provide for communication with similarly-enabled systems and devices, including the data file transfer communications described above.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the electronic device through the Data port 928 or computer readable program code is alternatively able to be provided to the electronic device 952 through the wireless network 950.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for private text chatting, the method comprising:
    sending a private text chat session request from a requesting device to a remote device to establish a private text chat session;
    receiving, at the requesting device prior to receiving an acceptance of the private text chat session request from the remote device, at least one initial private text chat message from the remote device, the at least one initial private text chat message being part of the private text chat session;
    storing the at least one initial private text chat message;
    receiving the acceptance of the private text chat session request from the remote device;
    displaying, on the requesting device subsequent to receiving the acceptance of the private text chat session request from the remote device, a private text chat session interface to conduct the private text chat session; and
    displaying the received at least one initial private text chat message in the private text chat session interface.

2. The method of claim 1, the displaying the received at least one initial private text chat message comprising displaying the at least one initial private text chat messages without indicia of a source of the at least one initial private text chat message.

3. The method of claim 1, further comprising exchanging data in association with the private text chat session.

4. The method of claim 1, further comprising:
    closing the private text chat session interface; and
    deleting, based on closing the private text chat session interface, the received at least one initial private text chat message and other data associated with the private text chat session interface.

5. The method of claim 1, further comprising displaying a full screen user interface display indicating at least one of a pending request to establish a private text chat session or a received request to establish a private text chat session.

6. The method of claim 1, further comprising suppressing, during the private text chat session, indications of at least some notifications.

7. The method of claim 1, further comprising:
    closing, based on one of displaying the private text chat session interface or receiving the acceptance, other text chat sessions; and
    delaying, during display of the private text chat session interface, indications of reception of text chat messages associated with other text chat sessions.

8. The method of claim 1, further comprising restricting, during display of the private text chat session interface, copying of the at least one initial private text chat message and other data associated with the private text chat session interface.

9. The method of claim 1, further comprising:
   determining, based on the sending, that the request has not been accepted; and
   terminating, based on determining that the request has not been accepted, the private text chat session.

10. The method of claim 9, wherein the determining that the request has not been accepted is based on at least one of receiving a message rejecting the request and determining expiration of a timeout from the time of sending the request.

11. The method of claim 9, wherein the determining that the request has not been accepted is based on determining expiration of a timeout from the time of sending the request, and
   the method further comprising sending, based on determining expiration of the timeout, a message to the remote device to terminate the private text chat session.

12. A device, the device comprising:
   a private text message storage;
   a private text chat processor coupled to the private text message storage, the private text chat processor, when operating:
      sends a private text chat session request to a remote device to establish a private text chat session;
      receives, prior to receipt of an acceptance of the private text chat session request from the remote device, at least initial private one text chat message from the remote device;
      stores the at least one initial private text chat message in the private text message storage, the at least one initial private text chat message being part of the private text chat session;
      receives the acceptance of the private text chat session request from the remote device;
      displays, subsequent to the receipt of the acceptance of the private text chat session request from the remote device, a private text chat session interface to conduct the private text chat session; and
      displays the received at least one initial private text chat message in the private text chat session interface.

13. The device of claim 12, wherein the private text chat processor, when operating, further displays the at least one initial private text chat messages without indicia of a source of the at least one initial private text chat message.

14. The device of claim 12, the private text chat processor, when operating, further exchanges data in association with the private text chat session.

15. The device of claim 12, the private text chat processor, when operating, further:
   closes the private text chat session interface; and
   deletes, based on closing of the private text chat session interface, the at least one initial private text chat message and other data associated with the private text chat session interface.

16. The device of claim 12, the private text chat processor, when operating, further displays a full screen user interface display indicating at least one of a pending request to establish a private text chat session or a received request to establish a private text chat session.

17. The device of claim 12, wherein the private text chat processor, when operating, further:
   determines, based on a sending of the request, that the request has not been accepted; and
   terminates, based on a determination that the request has not been accepted, the private text chat session.

18. The device of claim 17, wherein the private text chat processor, when operating, determines that the request has not been accepted based on at least one of receiving a message rejecting the request and determining expiration of a timeout from the time of sending the request.

19. The device of claim 17, wherein the private text chat processor, when operating, determines that the request has not been accepted based on determining expiration of a timeout from the time of sending the request, and
   wherein the private text chat processor, when operating, further sends, based on a determination of an expiration of the timeout, a message to the remote device to terminate the private text chat session.

20. A computer readable device having computer readable program code embodied therewith, the computer readable program code comprising instructions for:
   sending a private text chat session request from a requesting device to a remote device to establish a private text chat session;
   receiving, at the requesting device prior to receiving an acceptance of the private text chat session request from the remote device, at least one initial private text chat message from the remote device, the at least one initial private text chat message being part of the private text chat session;
   storing the at least one initial private text chat message;
   receiving the acceptance of the private text chat session request from the remote device;
   displaying, on the requesting device subsequent to receiving the acceptance of the private text chat session request from the remote device, a private text chat session interface to conduct the private text chat session; and
   displaying the received at least one initial private text chat message in the private text chat session interface.

* * * * *